United States Patent
Hellwig et al.

(10) Patent No.: US 7,328,038 B2
(45) Date of Patent: Feb. 5, 2008

(54) POWER CONTROL IN MOBILE COMMUNICATION SYSTEMS

(75) Inventors: Karl Hellwig, Wonfurt (DE); Stefan Bruhn, Sollentuna (SE); Fredrik Jansson, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 532 days.

(21) Appl. No.: 10/509,825

(22) PCT Filed: Apr. 2, 2003

(86) PCT No.: PCT/SE03/00534

§ 371 (c)(1), (2), (4) Date: Sep. 30, 2004

(87) PCT Pub. No.: WO03/084091

PCT Pub. Date: Oct. 9, 2003

(65) Prior Publication Data

US 2005/0136959 A1    Jun. 23, 2005

(30) Foreign Application Priority Data

Apr. 3, 2002    (SE) ............... PCT/SE02/00692

(51) Int. Cl.
H04B 7/00    (2006.01)
(52) U.S. Cl. ..................... 455/522; 455/69
(58) Field of Classification Search ........... 455/522, 455/69, 67
See application file for complete search history.

(56) References Cited

U.S. PATENT DOCUMENTS

| | | | |
|---|---|---|---|
| 5,345,598 A | | 9/1994 | Dent |
| 5,982,766 A | | 11/1999 | Nystrom et al. |
| 6,134,220 A | | 10/2000 | Le Strat et al. |
| 6,452,914 B2 | * | 9/2002 | Niemela ............... 370/337 |
| 6,697,642 B1 | * | 2/2004 | Thomas ............... 455/562.1 |
| 6,928,268 B1 | * | 8/2005 | Kroner ............... 455/69 |
| 7,010,320 B2 | * | 3/2006 | Komatsu ............... 455/522 |
| 7,164,710 B2 | * | 1/2007 | Komaili et al. ........... 375/229 |
| 2002/0114284 A1 | * | 8/2002 | Kronestedt et al. ........ 370/252 |
| 2004/0242256 A1 | * | 12/2004 | Xiao et al. ............. 455/522 |
| 2005/0099961 A1 | * | 5/2005 | Holma ............... 370/252 |

FOREIGN PATENT DOCUMENTS

| | | |
|---|---|---|
| WO | WO 01/93471 A1 | 12/2001 |
| WO | WO 01/95548 A1 | 12/2001 |

OTHER PUBLICATIONS

Swedish Patent Office International Search Report for PCT/SE03/00534 dated Jun. 17, 2003.

* cited by examiner

*Primary Examiner*—Matthew Anderson
*Assistant Examiner*—Angelica M. Perez

(57) ABSTRACT

In a radio communication system in a mobile to mobile call with one good (AMR102) and bad (AMR515) radio link, the good radio (AMR102) link is forced by the poor (AMR515) link to use a more robust AMR coded mode (AMR515) and thereby using excessive power (232). A capacity loss in such system is avoided by adjusting the power level (212) for the connection with the good link (AMR102).

12 Claims, 5 Drawing Sheets

POWER CONTROL IN MOBILE COMMUNICATION SYSTEMS

TECHNICAL FIELD OF THE INVENTION

The present invention generally concerns methods and arrangements relating to power control in a radio communication system. Specifically, the present invention relates to power control in a mobile to mobile AMR coded connection. The invention also includes radio communication networks and radio communication systems implementing said methods.

DESCRIPTION OF RELATED ART

In an interference limited deployment of a cellular system, a capacity limit is reached when adding more users which would imply that sufficient quality cannot be guaranteed to the users in the system. In such a system, capacity is determined by interference originating from transmissions from other users. To obtain maximum capacity in such a scenario, it is vital not to transmit more power than necessary, since all transmissions power add to the interference level in the system.

An important tool to limit unnecessarily high transmission levels is power control. With power control, the transmitter uses no more transmit power than is necessary to ensure that the receiver experiences adequate quality. At the same time power control is a measure of ensuring that despite varying radio channel conditions the quality of the transmission channel can be maintained such that it does not fall below certain levels.

Since the mobile stations move, and since the traffic distribution might be non-stationary, the transmit power must be continuously updated to compensate for the varying radio conditions that the mobile station experiences. More specifically, the power control should adapt to four time-varying phenomena:

Distance attenuation: the further away the mobile station gets from the base station, the higher transmit power must be used.

Shadow fading: As the mobile station moves, transmissions can be hindered by large objects, such as trees or buildings.

Fast fading: The carrier waves may interfere constructively or destructively, depending on the exact location of the mobile station, leading to rapid fluctuations of the received signal strength, (this is not valid for the power control in GSM, where the power control is too slow to follow the fast fading).

Varying interference: In systems with discontinuous transmission (DTX), interference will be bursty. During some parts of a conversation, the interference will be high, but during other parts, the interference may be low.

In virtually all power control algorithms, it is required that the receiver measures some entity, upon quantity which a power control decision can be made. The two most common examples are carrier-to-interference (C/I) ratio and the received power. Although the received power is easier to estimate, C/I based power control in general provides much better performance. The receiver then either signals the measured quantity to the transmitter, which adjusts the output power accordingly. Alternatively, the receiver may request or order the transmitter to adjust its output power. Power control commands can be either absolute or relative. With absolute power control commands, the transmitter is requested to adjust its output power to a specific level. With relative power control commands, the transmitter is requested to either increase or decrease its output power with some specific interval, relative to its current output power. Most often, both the uplink and downlink transmit powers are controlled by the network. The mobile station must obey commands for the uplink traffic. On the other hand, for systems where the mobile station transmits downlink power control commands, the network may choose to ignore them.

Traditionally speech coders in mobile communication systems have been fixed rate coders. That is, the bit rate of the data stream that conveys the speech information is fixed, and so is the amount of redundancy added for channel error protection. A compromise has to be made between the quality of the speech service, the gross bit rate of the radio channel and the degree of channel error protection: On one hand, maximum speech quality requires a high source bit rate and a high gross bit rate. On the other hand, the system resources are limited and the system should be able to accommodate a very large number of users at any given time. This means that the gross bit rate should be kept low, and that the speech service should be robust with respect to interference, which implies heavy channel coding.

The new Adaptive Multi-Rate (AMR) speech coding system for GSM overcomes the described problem by being adaptive both with respect to the source bit rate, by adapting the speech coder bit rate, and also with respect to the gross or channel bit rate by adapting between the full rate and half rate traffic channel. For an AMR coder example with 3 modes, the AMR code mode with the highest source bit rate, and thus the highest speech quality under error-free conditions is mode 3, while modes 2 and 1 have lower source bit rates and correspondingly lower quality under error-free conditions.

U.S. Pat. No. 5,982,766 (Johan Nyström, 9 Nov. 1999) relates to a power control method and system in a TDMA radio communication system that uses a combined mode switching and output power adjustment.

Accordingly, it would be highly desirable to provide a power control that uses the new Adaptive Multi-Rate (AMR) coder to improve the carrier-to-interference ratio and thereby improve capacity loss.

SUMMARY OF THE INVENTION

The problem dealt with by the present invention is capacity loss in a radio communication system, due to that in a mobile to mobile call with one good and one bad radio link, the good radio link is forced by the poor link to use a more robust AMR mode and thereby using excessive power.

Briefly, the present invention solves said problem, according to one aspect of the invention, by a method and system wherein either the uplink power or the downlink power is adjusted to a power level lower than an optimal power level for the connection with the highest associated C/I ratio.

According to another aspect either the uplink power or the downlink power is adjusted to a power level lower than an optimal power level for the connection with the highest AMR coded mode request.

The problem is solved by methods according to claims 1-2, and systems according to claims 10-13.

One object of the invention is to reduce the interference level in a radio communication system and thus to increase capacity.

Yet another object of the invention is to provide higher capacity in such a radio communication system with simple means, i.e. no added equipment or new functions.

Still another object of the invention is to decrease battery drain in mobile stations and thus to extend talktime.

An advantage afforded by the invention is reduced interference level in a radio communication system and thus an increased capacity.

Yet another advantage of the invention is higher capacity in a radio communication system with simple means, i.e. no added equipment or new functions.

Still another advantage of the invention is to decrease battery drain in mobile stations and thus to extend talktime.

Other objects, advantages and novel features of the invention will become apparent from the following detailed description of the invention when considered in conjunction with the accompanying drawings and claims.

DESCRIPTION OF PREFERRED EMBODIMENTS

Adapting the source coding rate is called codec mode adaptation and allows adapting the degree of error protection. At a given fixed gross bit rate (speech+channel coding), this mechanism varies the partitioning between source bit rate and the redundancy added for channel error protection.

Figure 1:
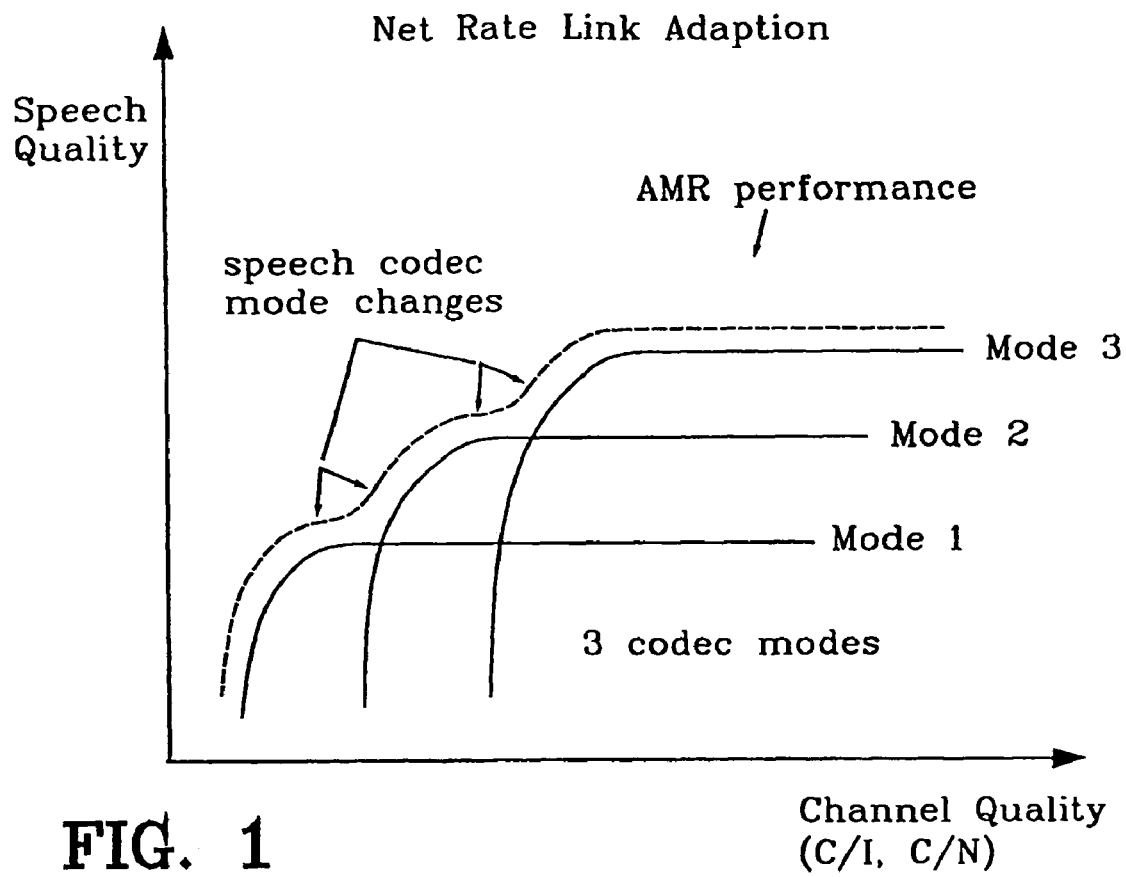
FIG. 1 is a curve chart illustrating speech quality of different AMR modes and the principle of mode adaptation.

The Adaptive Multi-Rate (AMR) speech coding system for European Global System for Mobile Communications (GSM) consists of a number of codec modes with different source bit rates. For each of these codec modes, there exist corresponding channel codecs, which perform the mapping between the source bits and the fixed number of transmitted gross bits. FIG. 1 displays a principle sketch of speech quality as a function of the channel quality for an example AMR codec with 3 modes. In this example, mode 3 has the highest source bit rate and thus the highest speech quality under error-free conditions. Modes 2 and 1 have lower source bit rates and correspondingly lower quality under error-free conditions. However, due to its relatively low error protection, codec mode 3 is sensitive to channel errors and breaks down in channel conditions for which mode 2 and, particularly, mode 1 still exhibit robust operation. Codec mode 1 is the most robust mode and can operate under channel conditions where the other modes have already broken down.

TAB 1

| Mode | Bit rate [kb/s] |
|---|---|
| AMR475 | 4.75 |
| AMR515 | 5.15 |
| AMR59 | 5.9 |
| AMR67 | 6.7 |
| AMR74 | 7.4 |
| AMR795 | 7.95 |
| AMR102 | 10.2 |
| AMR122 | 12.2 |

For a given gross bit rate (speech+channel coding) different quality curves can be obtained by changing the partitioning between speech and channel coding. The idea with AMR is to use a multi mode speech coder and to change the speech coder mode based on channel quality measurements to always use the optimal speech coder mode. Ideally, this allows for achieving a speech quality curve of the AMR codec that corresponds to the envelope of the quality curves of the individual codec modes. This is illustrated in FIG. 1 by the dashed line. TAB. 1 shows the bit rate of the eight AMR speech coder modes.

The principle operation of AMR codec mode adaptation is as follows. Incoming speech is source and channel encoded, see the Speech Encoder block SPE in FIG. 5, applying the currently selected codec and channel modes. The resulting payload gross bits are transmitted over the air interface together with adaptation data from codec mode adaptation. Codec mode adaptation data consists either of link measurement data, i.e. any data reflecting the estimated channel quality/capacity or of a codec mode request MR1, MR2 informing the sending side, first mobile station MS1, about the codec mode it should select. The receiving side, second mobile station MS2, detects the codec mode used and applies it for channel and source decoding of the received speech payload data in Speech Decoder block SPD. The received link measurement data or codec mode request is used for choosing the codec mode for the outgoing second link UL2. Moreover, the receiving side, second mobile station MS2, performs measurements on the incoming second link DL2, which leads to link measurement data or a codec mode request MR2 for that link. Link measurement data is generated by a link measurement device second Link Adaptation block LA2 in the receiving side, second mobile station MS2. It is indicative of the measured quality of the incoming link. This data can—after suitable quantization—be directly transmitted to the sending side, first mobile station MS1, or it can first be fed into an adapter device, second Link Adaptation block LA2. The adapter generates a codec mode request, second AMR mode code request MR2, or a command in response to the measurement data, which is an indication of the codec mode to be used by the sending side, first mobile station MS1. If this adapter, second Link Adaptation block LA2, is located on the receiving side, second mobile station MS2, the corresponding codec mode request/command, second AMR mode request MR2 is sent to the sending side, first mobile station MS1, instead of the original measurement data. However, if the adapter, first Link Adaptation block LA1, is located at the sending side, first mobile station MS1, the measurement data has to be transmitted to that side.

However, one skilled in the art will recognize that other coders such as e.g. audio, video or speech coders with the same/similar characteristics as the AMR speech coder may be used in the future.

Figure 5:
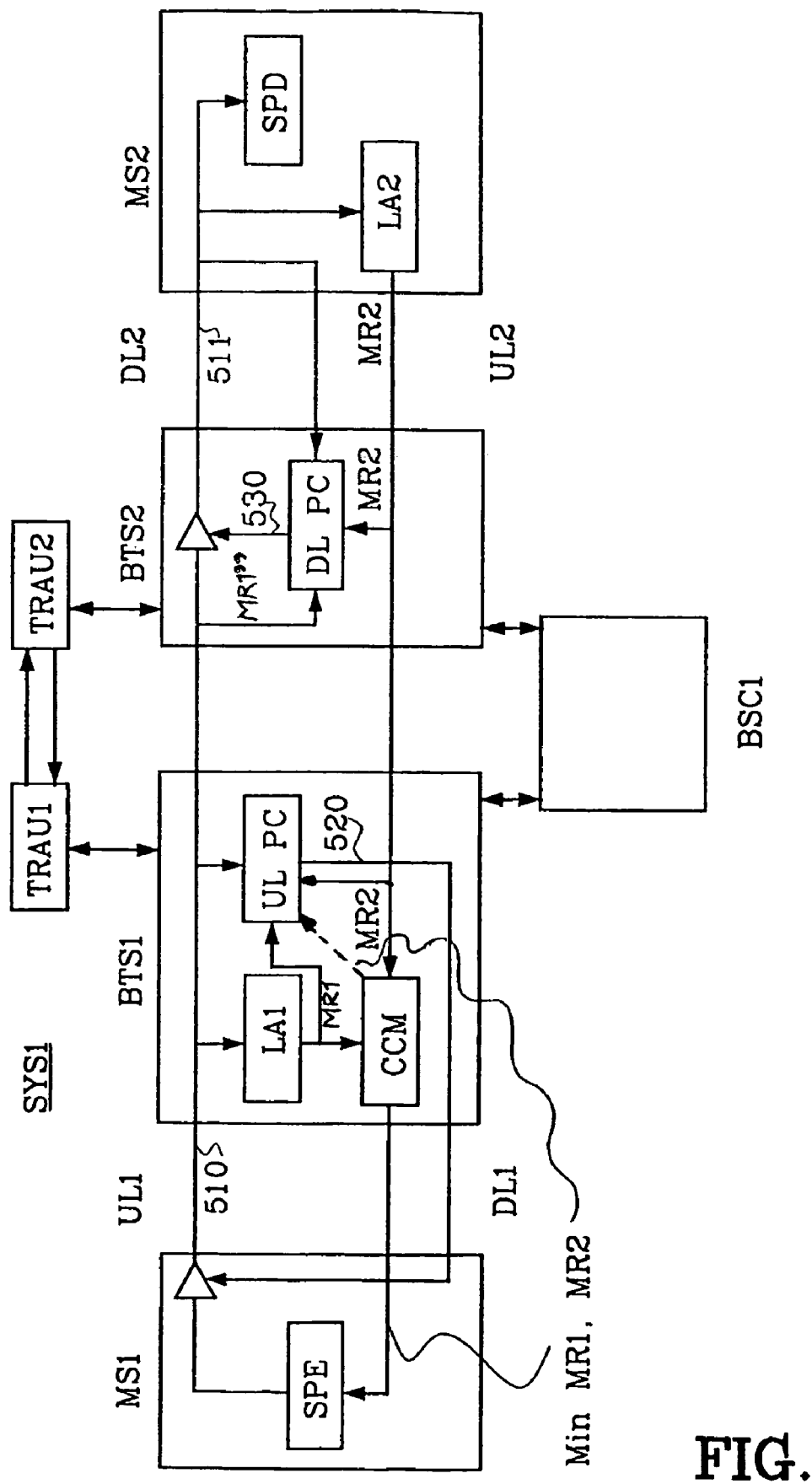
FIG. 5 is a block diagram illustrating mobile to mobile AMR coded connection according to the invention.

Further in FIG. 5, the first base station BTS1 and second base station BTS2 are in communication with a base station controller BSC1. As a person skilled in the art appreciates, first MS1 and second MS2 mobile station can be in communication with the same base station, the parts of uplink and downlink communication is then physically separated in the one base station, this is not shown in FIG. 3, or separated by using different timeslots or channel frequencies. In between first base station BTS1 and second base station BTS2 are two transcoder units, first transcoder unit TRAU1 and second transcoder unit TRAU2. In a tandem free connection en- and decoding is not needed whereby the transcoding units are bypassed.

A binding codec mode request is usually referred to as "codec mode command" whereas if this is merely the indication of the preferred mode and the sending side has the authority to override it, it is referred to as "codec mode request" MR. This distinction is of minor relevance in the context of the invention. AMR coded mode requests MRs are generated by the codec mode adaptation device based on an estimate of the channel quality. This operation is a mapping of the measurement to the AMR coded mode request MR. This may involve the comparison of the measurement values with certain thresholds. The measurements can be any channel quality estimate. Usually, as it is specified in GSM 05.09, MRs are generated by comparing a filtered carrier-to-interference (C/I) ratio measurement value with some thresholds. Filtering of measurement values is usually done with a filter having memory since instantaneous measurements taken from only one time-division multiple-access (TDMA) burst or one frame usually are too strongly fluctuating. The purpose of the filtering is to generate a measurement value which deviates less from the expectation of the true value than the instantaneous measurements. Typical filters are linear smoothing and prediction filters having a length of 500 ms. Examples for such filters are given in 'GSM 05.09: Link Adaptation'. The AMR speech coding standard comprises of 8 different modes but for efficiency reasons only 4 out of the 8 modes are allowed at call setup. Thus, if the MRs are transmitted using a block code, the code could comprise 4 different code words which would allow to directly signal any of the modes.

In FIG. 5 the first base station BTS1 measures the quality of the first uplink UL1. Based on this measurement the first base station BTS1 sends a command to the first mobile station MS1 to select the appropriate coder mode. The system is symmetrical i.e. the second mobile station MS2 normally controls the second downlink DL2 mode MR2 but there is a possibility for the second base station BTS2 to override the second mode requested MR2 by the second mobile station MS2. This feature can be used in tandem free connection and can also be used to compensate for poor mobile station implementations.

In most mobile communication systems a mobile to mobile call will introduce two stages of speech coding, one for each radio links. Each of these stages will give a quality degradation even under perfect radio channel conditions. In order to avoid this "tandem" encoding so called tandem free operation has been standardized for GSM. Note that tandem free in the context of this invention does include both the case where the network transcoder is in the speech path (normally referred to as tandem free operation) and the case with no network transcoder (normally referred to as transcoder free operation).

Figure 4:
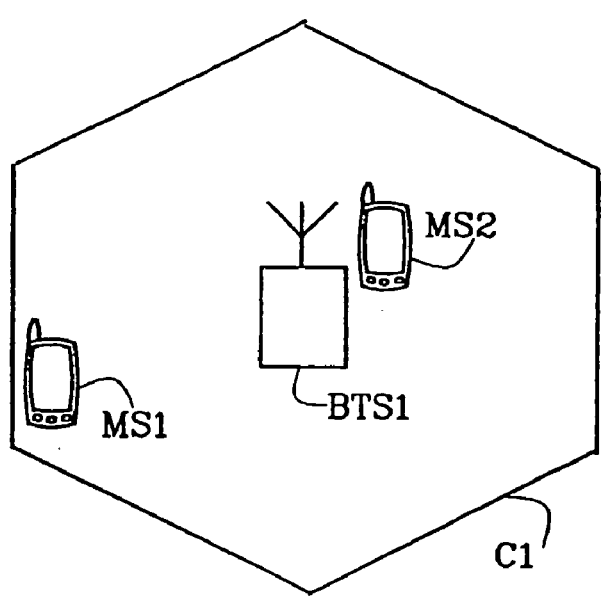
FIG. 4 is a schematic diagram of a cell in a radio communication system comprising a base station and mobile stations.

In FIG. 4 the second mobile station MS2 is closer to the base station BTS1, and accordingly having a better link than the first mobile station MS1 being further away from the base station BTS1. In a tandem free mobile to mobile connection there are two radio links in series see first uplink UL1 in series with second downlink DL2 and second uplink UL2 in series with first downlink DL1 in FIG. 5. The example of first mobile station MS1 and second mobile station MS2 in FIG. 4 is illustrated by the block diagram in FIG. 5. The quality of the first uplink UL1 from a first mobile station MS1 to a first base station BTS1 is monitored by the first link adaptation LA1 in first base station BTS1 and the quality of the downlink from second base station BTS2 to second mobile station MS2 is monitored by the second link adaptation LA2 in second mobile station MS2. In this example second downlink DL2 is having very good radio conditions (high carrier-to-interference C/I ratio) and therefore the link adaptation requests e.g. will be the high rate mode, AMR102, see TAB. 1, from the other end. If this had been a mobile to landline call this request would have been granted by second base station BTS2. In a mobile to mobile call the request has to be passed on to first base station BTS1. In the example the radio link conditions on first uplink UL1 is poor and the first link adaptation LA1 in first base station BTS1 requests e.g. the robust mode AMR515.

In this case the optimal mode to use is the AMR515. In tandem connections there is a function in the first base station BTS1 after first link adaptation LA1 that combines (see block CCM, Combined Code Mode) the mode requests MR1,MR2 for the two links, first uplink UL1 and second downlink DL2, and selects the lower of the two which is passed on to first mobile station MS1. From a speech quality point of view this is the optimal choice. This may not be obvious but the alternative to introduce two stages of speech coding is always degrading the speech quality more. For example, AMR515 in a single encoding is always better than AMR515 in tandem with AMR102.

In the GSM system there is a function called power control. The purpose of the power control is to increase the transmitting power for the users that have a poor carrier-to-interference C/I ratio and decrease it for the users that have a too good C/I. In the exemplary case, according to the invention, for first mobile station MS1 the speech quality is too low and need to be improved and in exemplary latter case for second mobile station MS2 it is a waste of resources to have a C/I ratio above the level which gives acceptable speech quality.

Figure 2:
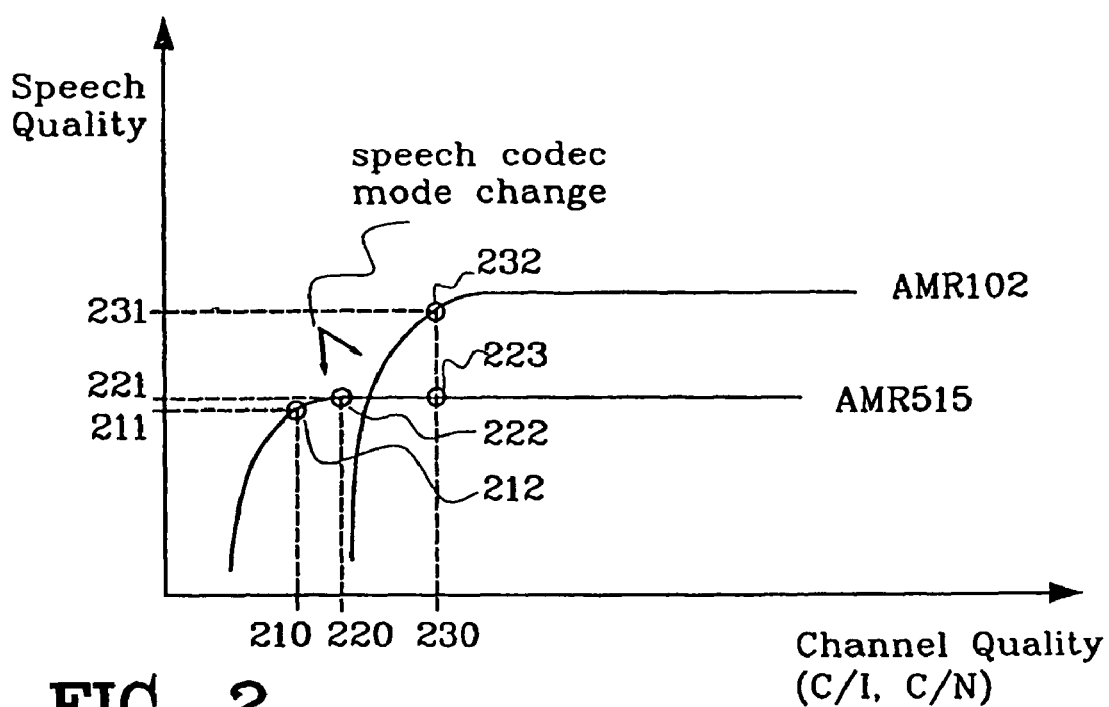
FIG. 2 is a curve chart illustrating speech quality of MR515 and MR102 AMR modes.
Figure 3:
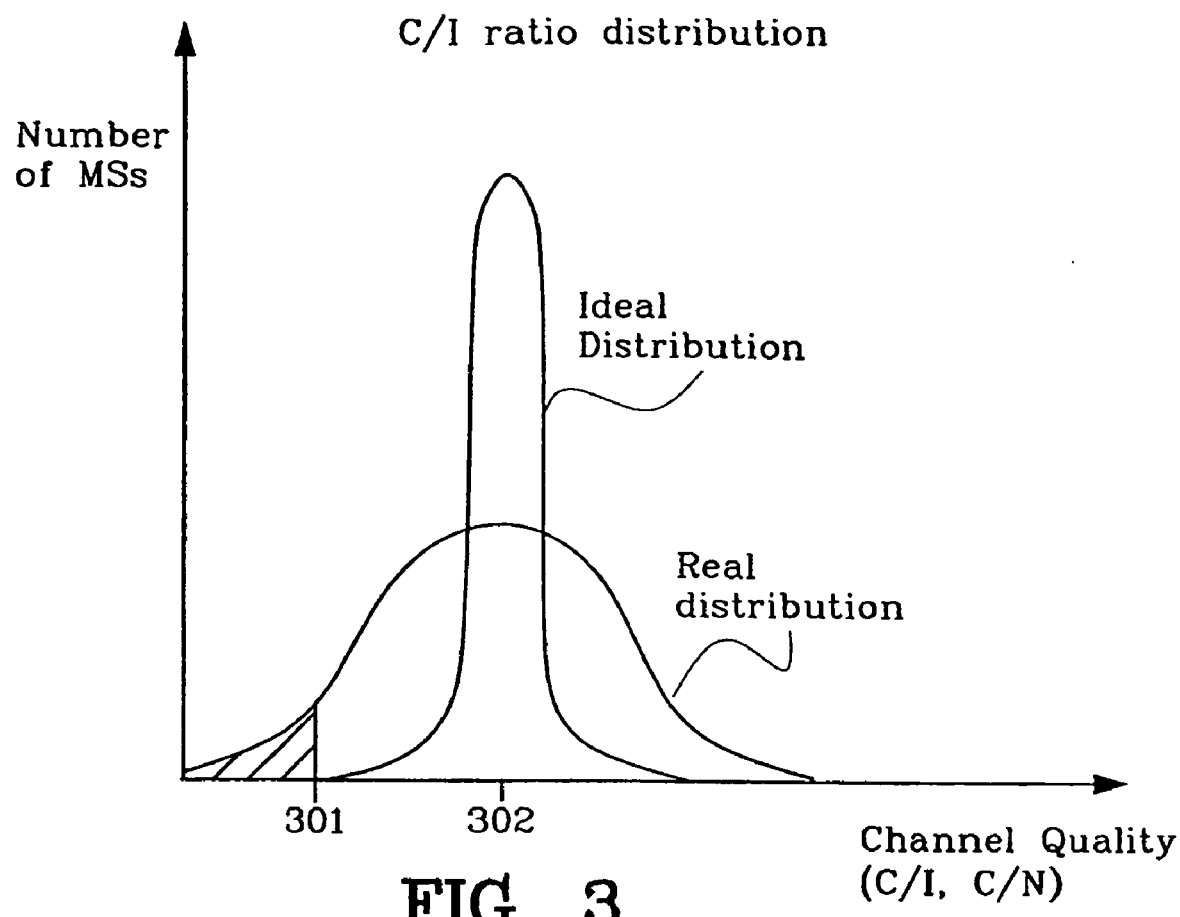
FIG. 3 is a curve chart illustrating C/I ratio distribution for mobile stations in a radio communication system.

Ideally the power control would make all users experience the same C/I, see the ideal distribution curve in FIG. 3. In reality this is far from true, see the real distribution curve in FIG. 3, and there are several reasons for this. First of all, there is a maximum possible output power. One other issue with power control is that it unlike AMR affects other users. A power change will not only change the C/I ratio for the controlled link but it also change the C/I ratio for other links since it changes the interference level. This means that even in systems with power control, different users will experience different C/I ratios and the situation described in the example above will be present in a significant number of the mobile to mobile connections in a system. Ideally no mobile stations will obtain a C/I ratio below point 301 in FIG. 3, see the dashed area. For a mobile station with a certain AMR coded mode, e.g. AMR515, an optimal C/I ratio 210 can be obtained, this optimal C/I ratio 210 is normally just before the AMR coded mode curve is straightening, see point 212 for AMR515 in FIG. 2. The C/I ratio point 230 illustrate the point 232 where an optimal C/I ratio is obtained for the higher AMR coded mode AMR102. At C/I point 220,222 in FIG. 2 the curve starts straightening, and between that C/I point 220,222 and a C/I point 230,223, the speech quality 221 is at the same level.

A first example is the situation of suddenly degrading radio channels. Assume first that the C/I ratio on first uplink UL1 gets worse than required for the codec mode presently used by first mobile station MS1. In this case first base station BTS1 would sense the degraded channel condition and send the request for a more robust mode to first mobile station MS1. The adaptation action would comprise the short effective control loop: BTS1-DL1-MS1-UL1.

A second example is the case that the C/I on second downlink DL2 gets worse than required for the codec mode presently used. In that case second mobile station MS2 would sense the degraded channel condition and request a more robust mode. This request is sent via second uplink UL2 to second base station BTS2 from where it is propagated through air to first base station BTS1. First base station BTS1 sends this request further to first mobile station MS1 provided that it is lower than required for first uplink UL1. The adaptation action would comprise the big effective control loop: MS2-UL2-BTS2-BTS1-DL1-MS1-UL1-BTS1-BTS2-DL2. However, one skilled in the art will recognize that the first base station controller BSC1 can be an over all control unit.

The problem with the situation described in the first and second example in section above is not so much loss in speech quality. The worst of the two radio links acts as a bottleneck and sets the limit for the achievable speech quality; this can not be solved. The problem in this case is that the good radio link uses excessive power. This can be translated to a capacity loss in the system.

Because of the fact that the good link is forced by the poor link to use a more robust AMR mode e.g. AMR515 than AMR102 there is room to make the C/I 230 ratio worse on the good link. This can be done by the power control according to the invention. According to the invention, if the power control algorithm is aware of the fact that it is a mobile to mobile AMR coded connection and if it has access to the two mode requests e.g. AMR102,AMR515 in FIG. 2 it can adjust (e.g. from C/I ratio at 230 to C/I ratio at 210) the power to avoid excessive C/I ratio 230 on the good link. The capacity gain will depend on the number of mobile to mobile calls in the system and also on the C/I distribution. It is likely that this gain will not be insignificant. According to the invention if the good link requesting the AMR coded mode AMR102 with the optimal C/I ratio 230, and bad link requesting the AMR coded mode AMR515 with optimal C/I ratio 210, the good link can lower its optimal C/I ratio 230 to C/I ratio 220 without loosing in speech quality for the combined lower AMR coded mode AMR515.

The target C/I ratio for the power control is set to a level that gives the desired speech quality, see FIG. 2. For this C/I target one of the AMR modes is the optimal, normally one of the highest rate modes. In a mobile to mobile AMR coded connection where the codec mode requests are combined (in block CCM in FIG. 5) one of the mobiles e.g. second mobile station MS2 with a good link, second downlink DL2, may be forced by the poor link, first uplink UL1, to use a more robust AMR mode AMR515. Keeping the C/I target 230 for the good link, second downlink DL2 in this case will be of no use since it is above the C/I 230 ratio for which the quality of the more robust mode AMR515 is improved, it can be lowered from point 223 to point 222 without decreasing the speech quality 221 as can be seen in FIG. 2.

According to the invention a sensor in e.g. the downlink power control DL PC in second base station BTS2 compares the second codec mode request MR2 from second mobile station MS2 with the presently applied codec mode MR1" (MR1bis) on second downlink DL2. The second downlink power 511 is adjusted accordingly by a power command 530. The second codec mode request MR2 is passed on to first base station BTS1. Further according to the invention the second codec mode requested MR2, passed on to first base station BTS1, is compared with first codec mode requested MR1 and the first uplink power 510 is adjusted accordingly by a power command 520. If the codec mode, requested in second codec mode request MR2, is less robust, higher bit rate, than presently applied codec mode MR1" (MR1bis) on second downlink DL2, the downlink power 511 is decreased for that connection to a power level lower than the optimal power level for the connection with the highest associated C/I ratio. In this case the second downlink DL2 connection is associated with the highest C/I ratio. If instead the codec mode, requested in first codec mode request MR1, is less robust, higher bit rate, than the codec mode, requested in second codec mode request MR2, the uplink power 510 is decreased for that connection to a power level lower than the optimal power level for the connection with the highest associated C/I ratio. In this case the first uplink UL1 connection is associated with the highest C/I ratio. The incoming signals to uplink power control UL PC can e.g. be first MR1 and second MR2 requested modes, but can also be MR1 and the applied combined codec mode in block CCM in FIG. 5. As long as the request MR1 from first mobile station MS1 is for a higher bitrate, less robust mode, than the applied combined codec mode in block CCM the transmit power 510 is decreased for that connection. This action leads to a lower C/I (C/I at 230 compared to C/I at 220 in FIG. 2) on the first uplink UL1 but this will not decrease the speech quality 221. The decreased power will on the other hand reduce interference in the system. It is expected that the proposed decrease of the transmission power will lead to significant system capacity savings.

Figure 6:
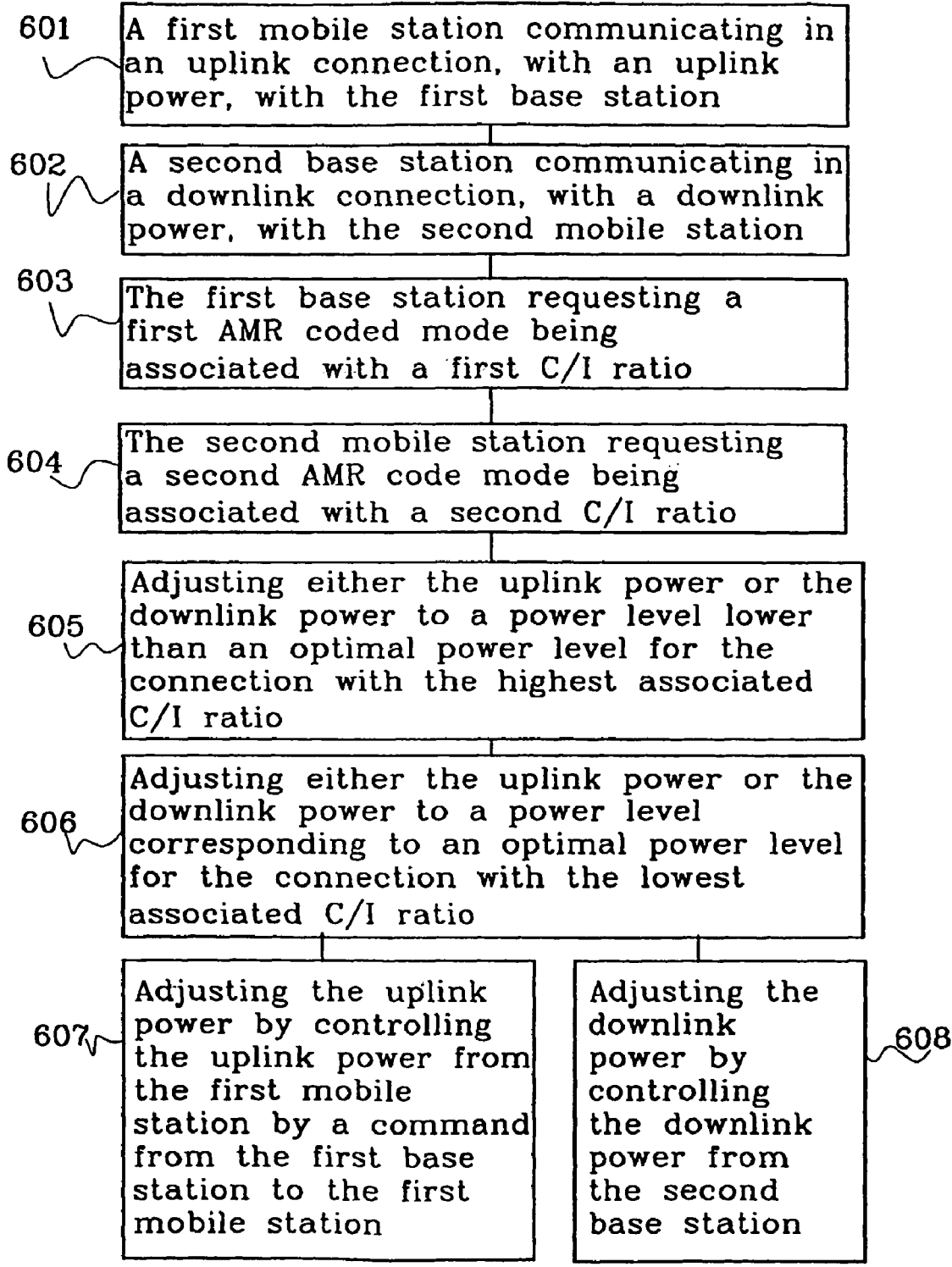
FIG. 6 is a flow chart illustrating a power control technique according to a first embodiment of the invention.

The flowchart 600 of FIG. 6 illustrates a first exemplary embodiment of the invention according to which a power control is modified to incorporate either the uplink or the downlink lower power control level for the connection with the highest C/I ratio. A radio communication system SYS1 comprising of first base station BTS1 and second base station BTS2 and first mobile station MS1 and second mobile station MS2. In first step 601, the first mobile station MS1 communicates in an uplink UL1 connection with an uplink power 510 with the first base station BTS1. In next step 602, the second base station BTS2 communicates in a downlink DL2 connection with a downlink power 511 with the second mobile station MS2. Further in step 603, the first base station BTS1 requests a first AMR coded mode MR1 which is associated with a first C/I ratio 210,230. Next, in step 604, the second mobile station MS2 requests a second AMR coded mode MR2 which is associated with a second C/I ratio 210,230. Either the uplink power 510 or the downlink power 511 is adjusted to a power level lower than an optimal power level for the connection UL1,DL2 with the highest associated C/I 230 ratio. In step 606 the power 510,511 is adjusted to a power level corresponding to an optimal power level for the connection with the lowest associated C/I ratio 210. However, one skilled in the art will recognize that the power level can go below what is an optimal level 212 for the corresponding AMR coded mode e.g. AMR515 if that gives a speech quality which is appropriate for both mobile stations MS1,MS2. The uplink power 510 from the first mobile station MS1 is controlled by a command 520 from the first base station BTS1 in step 607, and the downlink power 511 in step 608 from the second mobile station MS2 is controlled by a command 530 from the second base station BTS2. Instead of two base stations BTS1,BTS2 one base station unit may be used or the power level can be adjusted from a base station controller BSC1.

Figure 7:
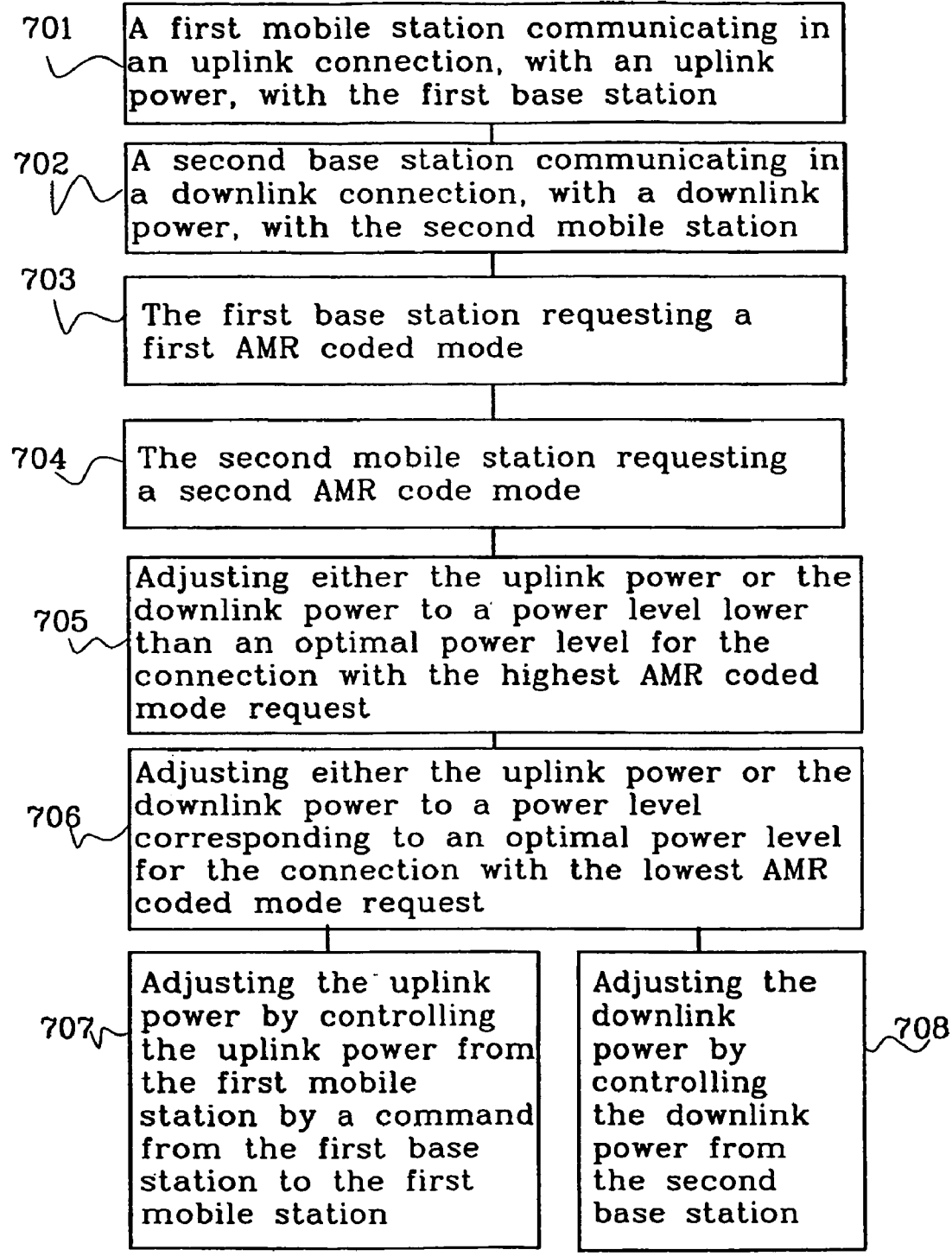
FIG. 7 is a flow chart illustrating a power control technique according to a second embodiment of the invention.

The flowchart 700 of FIG. 7 illustrates a second exemplary embodiment of the invention according to which a power control is modified to incorporate either the uplink or downlink lower power control level for the connection with the highest AMR coded mode request AMR102. A radio communication system SYS1 comprising of first base station BTS1 and second base station BTS2 and first mobile station MS1 and second mobile station MS2. In first step 701, the first mobile station MS1 communicates in an uplink UL1 connection with an uplink power 510 with the first base station BTS1. In next step 702, the second base station BTS2 communicates in a downlink DL2 connection with a downlink power 511 with the second mobile station MS2. Further in step 703, the first base station BTS1 requests a first AMR coded mode MR1. Next, in step 704, the second mobile station MS2 requests a second AMR coded mode MR2. Either the uplink power 510 or the downlink power 511 is adjusted to a power level lower than an optimal power level for the connection UL1,DL2 with the highest AMR coded mode request MR1,MR2,AMR102. In step 706 the power 510,511 is adjusted to a power level corresponding to an optimal power level for the connection with the lowest AMR coded mode request MR1,MR2,AMR515. However, one skilled in the art will recognize that the power level can go below what is an optimal level 212 for the corresponding AMR coded mode e.g. AMR515 if that gives a speech quality which is appropriate for both mobile stations MS1, MS2. The uplink power 510 from the first mobile station MS1 is controlled by a command 520 from the first base station BTS1 in step 707, and the downlink power 511 in step 708 from the second mobile station MS2 is controlled by a command 530 from the second base station BTS2. Instead of two base stations BTS1,BTS2 one base station unit may be used or the power level can be adjusted from a base station controller BSC1.

In FIG. 5 the second base station BTS2 comprises e.g. in block Downlink Power Control DL PC means for adjusting the downlink power 511 to a power level lower than an optimal power level 232 for the connection with the highest associated C/I 230 ratio.

In FIG. 5 the first base station BTS1 comprises in block Uplink Power Control UL PC means for sending an uplink power command 520 for adjusting the uplink power 510 to a power level lower than an optimal power level for the connection with the highest associated C/I 230 ratio.

In FIG. 5 the second base station BTS2 comprises e.g. in block Downlink Power Control DL PC means for adjusting the downlink power 511 to a power level lower than an optimal power level 232 for the connection with the highest AMR coded mode request AMR102.

In FIG. 5 the first base station BTS1 comprises e.g. in block Uplink Power Control UL PC means for sending an uplink power command 520 for adjusting the uplink power 510 to a power level lower than an optimal power level 232 for the connection with the highest AMR coded mode request.

DTX is a technique essentially turning off transmission during periods of speech inactivity. The purpose of DTX is to reduce the interference level in a radio network and thus to increase capacity. Furthermore, DTX helps to decrease battery drain in Mobile Stations and thus to extend talktime. DTX does not totally turn off transmission during speech inactivity. Rather, so-called Silence Descriptor frames (SID) conveying a description of the background noise characteristics are transmitted to the receiver enabling it to generate a comfort noise signal. In GSM AMR, SID frames are transmitted at a rate of once per 8 frames (160 ms) (see GSM 06.93). AMR SID frames do not only convey comfort noise parameters. In addition, they comprise coded mode adaptation data, which, apart from other data, are the MRs for the other link. These CMRs are encoded using a 16 bit block code (see GSM 05.03).

As a person skilled in the art appreciates, application of the invention is in no way limited to only cellular radio communication networks conforming to the GSM specification. The AMR speech coder is also specified for Universal Mobile Telecommunications Service (UMTS) even though a link adaptation system similar to GSM is not specified. The same basic principle is however applicable to UMTS regardless of how the AMR mode is selected on the two radio links in a UMTS mobile to mobile call. Thus the invention is also applicable in other Code Division Multiple Access (CDMA) based cellular communication system, e.g. cellular networks adhering to the IS-95, and the CDMA-2000 specifications.

As will be recognized by those skilled in the art, the innovative concepts described in the present application can be modified and varied over a wide range of applications. Accordingly, the scope of patented subject matter should not be limited to any of the specific exemplary teachings discussed.

The invention claimed is:

1. A method of controlling transmit power in a call between a first mobile station and a second mobile station in a radio communication system having a first base station in communication with the first mobile station and a second base station in communication with the second mobile station, said method comprising the steps of:

communicating through an uplink connection from the first mobile station to the first base station utilizing an uplink power;

communicating through a downlink connection from the second base station to the second mobile station utilizing a downlink power;

requesting by the first base station, a first Adaptive Multi-Rate (AMR) coded mode for use on the uplink connection, said first AMR coded mode being associated with an uplink Carrier-to-Interference (C/I) ratio;

requesting by the second mobile station, a second AMR coded mode for use on the downlink connection, said second AMR coded mode being associated with a downlink C/I ratio;

determining the connection having the highest associated C/I ratio; and adjusting either the uplink power or the downlink power to a power level lower than an optimal power level for the connection with the highest associated C/I ratio without changing the AMR coded mode for either the uplink connection or the downlink connection.

2. The method of claim 1, further comprising adjusting either the uplink power or the downlink power to a power level corresponding to an optimal power level for the connection with the lowest associated C/I ratio.

3. The method of claim 1, wherein the step of adjusting either the uplink power or the downlink power includes controlling the uplink power from the first mobile station by a command from the first base station to the first mobile station.

4. The method of claim 1, wherein the step of adjusting either the uplink power or the downlink power includes controlling the uplink power from the first mobile station by a command from a base station controller associated with the first base station.

5. The method of claim 1, wherein the step of adjusting either the uplink power or the downlink power includes controlling the downlink power from the second base station.

6. The method of claim 1, wherein the step of adjusting either the uplink power or the downlink power includes controlling the downlink power from a base station controller associated with the second base station.

7. The method of claim 1, wherein the first base station and the second base station are the same base station.

8. A method of controlling transmit power in a call between a first mobile station and a second mobile station in a radio communication system having a first base station in communication with the first mobile station and a second base station in communication with the second mobile station, said method comprising the steps of:
communicating through an uplink connection from the first mobile station to the first base station utilizing an uplink power;
communicating through a downlink connection from the second base station to the second mobile station utilizing a downlink power;
requesting by the first base station, a first Adaptive Multi-Rate (AMP) coded mode for use on the up link connection;
requesting by the second mobile station, a second AMP coded mode for use on the down link connection;
determining the connection having the highest AMR coded mode reguest; and
adjusting either the uplink power or the downlink power to a power level lower than an optimal power level for the connection with the highest AMR coded mode request without changing the AMR coded mode for either the downlink connection or the uplink connection.

9. The method of claim 8, further comprising adjusting either the uplink power or the downlink power to a power level corresponding to an optimal power level for the connection with the lowest AMP coded mode request.

10. A radio communication system for conducting a call between a first mobile station and a second mobile station, said system comprising:
a first base station in communication with the first mobile station over an uplink connection having an uplink power and an associated uplink Carrier-to-Interference (C/I) ratio;
a second base station in communication with the second mobile station over a downlink connection having a downlink power and an associated downlink C/I ratio; and
means for determining for the down link connection and the uplink connection, the highest associated C/I ratio;
wherein the first base station includes:
means for requesting a first Adaptive Multi-Rate (AMP) coded mode for use on the uplink connection, said first AMR coded mode being associated with the uplink C/I ratio; and
means for sending an uplink power command to the first mobile station for adjusting the uplink power to a power level lower than an optimal power level for the connection with the highest associated C/I ratio without changing the AMP coded mode associated with the uplink connection; and
wherein the second base station includes:
means for receiving a request from the second mobile station to utilize a second AMR coded mode on the downlink connection, said second AMR coded mode being associated with the downlink C/I ratio; and
means for adjusting the downlink power to a power level lower than an optimal power level for the connection with the highest associated C/I ratio without changing the AMR coded mode associated with the downlink connection.

11. A radio communication system for conducting a call between a first mobile station and a second mobile station, said system comprising:
a first base station comprising:
means for communicating with the first mobile station over an uplink connection having an uplink power; and
means for requesting a first Adaptive Multi-Pate (AMR) coded mode for use on the uplink connection;
a second base station comprising:
means for communicating with the second mobile station over a downlink connection having a downlink power; and
means for receiving a request from the second mobile station to utilize a second AMR coded mode on the downlink connection; and
means for determining the connection having the highest AMR coded mode request; and
means for instructing either the first mobile station or the second base station to adjust either the uplink power or the downlink power, respectively, to a power level lower than an optimal power level for the connection with the highest AMR coded mode request without changing the AMR coded mode of the uplink connection.

12. The radio communication system of claim 11 wherein the first base station and the second base station are the same base station.

* * * * *

UNITED STATES PATENT AND TRADEMARK OFFICE
CERTIFICATE OF CORRECTION

PATENT NO. : 7,328,038 B2
APPLICATION NO. : 10/509825
DATED : February 5, 2008
INVENTOR(S) : Hellwig et al.

It is certified that error appears in the above-identified patent and that said Letters Patent is hereby corrected as shown below:

In Column 11, Line 29, in Claim 8, delete "(AMP)" and insert -- (AMR) --, therefor.

In Column 11, Line 31, in Claim 8, delete "AMP" and insert -- AMR --, therefor.

In Column 11, Line 34, in Claim 8, delete "reguest;" and insert -- request; --, therefor.

In Column 11, Line 44, in Claim 9, delete "AMP" and insert -- AMR --, therefor.

In Column 12, Line 5, in Claim 10, delete "(AMP)" and insert -- (AMR) --, therefor.

In Column 12, Line 12, in Claim 10, delete "AMP" and insert -- AMR --, therefor.

In Column 12, Line 32, in Claim 11, delete "Multi-Pate" and insert -- Multi-Rate --, therefor.

Signed and Sealed this

Tenth Day of March, 2009

JOHN DOLL
*Acting Director of the United States Patent and Trademark Office*